United States Patent [19]

Palmer

[11] Patent Number: 4,715,641
[45] Date of Patent: Dec. 29, 1987

[54] MOUNTING APPARATUS FOR A GRAPPLE HEAD ASSEMBLY

[75] Inventor: Marvin K. Palmer, Oswego, Ill.

[73] Assignee: Caterpillar Inc., Peoria, Ill.

[21] Appl. No.: 906,066

[22] Filed: Sep. 11, 1986

[51] Int. Cl.$^4$ .............................................. F16F 7/08
[52] U.S. Cl. ................................ 294/119.4; 188/71.1; 188/83
[58] Field of Search ............... 294/119.4, 67.21, 68.23, 294/86.4, 88, 106; 188/83, 71.1, 130, 366, 367, 368, 378, 196 D, 196 V; 37/183 R; 403/15, 31, 113, 120, 146, 147, 157; 414/626, 732–735, 738–740

[56] References Cited

U.S. PATENT DOCUMENTS

| | | | |
|---|---|---|---|
| 3,937,302 | 2/1976 | Palmcrantz | 294/119.4 |
| 4,335,914 | 6/1982 | Korbel | 294/86 R |
| 4,417,759 | 11/1983 | Pierrot | 294/86 R |
| 4,463,933 | 8/1984 | Schreyer et al. | 188/71.1 |

OTHER PUBLICATIONS

Product Information Catalog 275–1A published by Esco Corporation entitled, "Type III Snubber Assembly".

Primary Examiner—James B. Marbert
Attorney, Agent, or Firm—William C. Perry

[57] ABSTRACT

In the mounting of a grapple arrangement to the boom of a vehicle, it is desirable to provide motion dampeners between the hinged joints of the components. Various types of motion dampening devices have been employed which are mounted in a location that subject the device to structural damage or contamination. The present invention overcomes these drawbacks by providing the mounting apparatus between a grapple arrangement and the rotator of a boom that includes a mounting link. The connection between the mounting link and each of the rotator and grapple arrangement comprises a pair of pin assemblies and that allows relative rotation therebetween about two generally horizontal axes. Along each axis, a motion dampening device or snubber is mounted in association with one of the pin assemblies to apply a preselected amount of force against the pin assembly to resist the relative motion. Each snubber assembly is nested within the structure that is provided by the various portions of the mounting apparatus. Being so mounted, each snubber assembly is shielded from contact with surrounding objects and thus protected from damage that would otherwise be likely occur.

19 Claims, 4 Drawing Figures

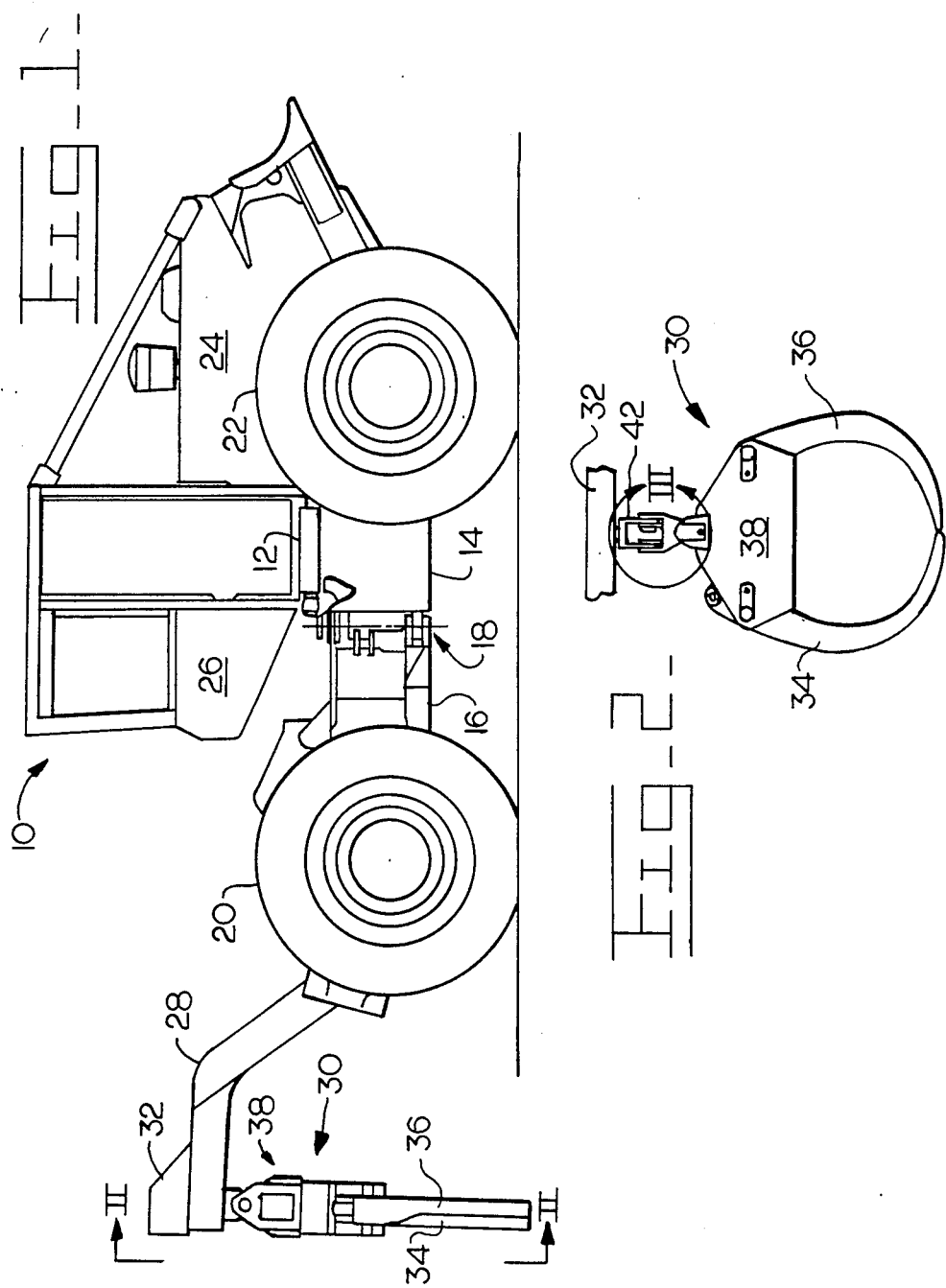

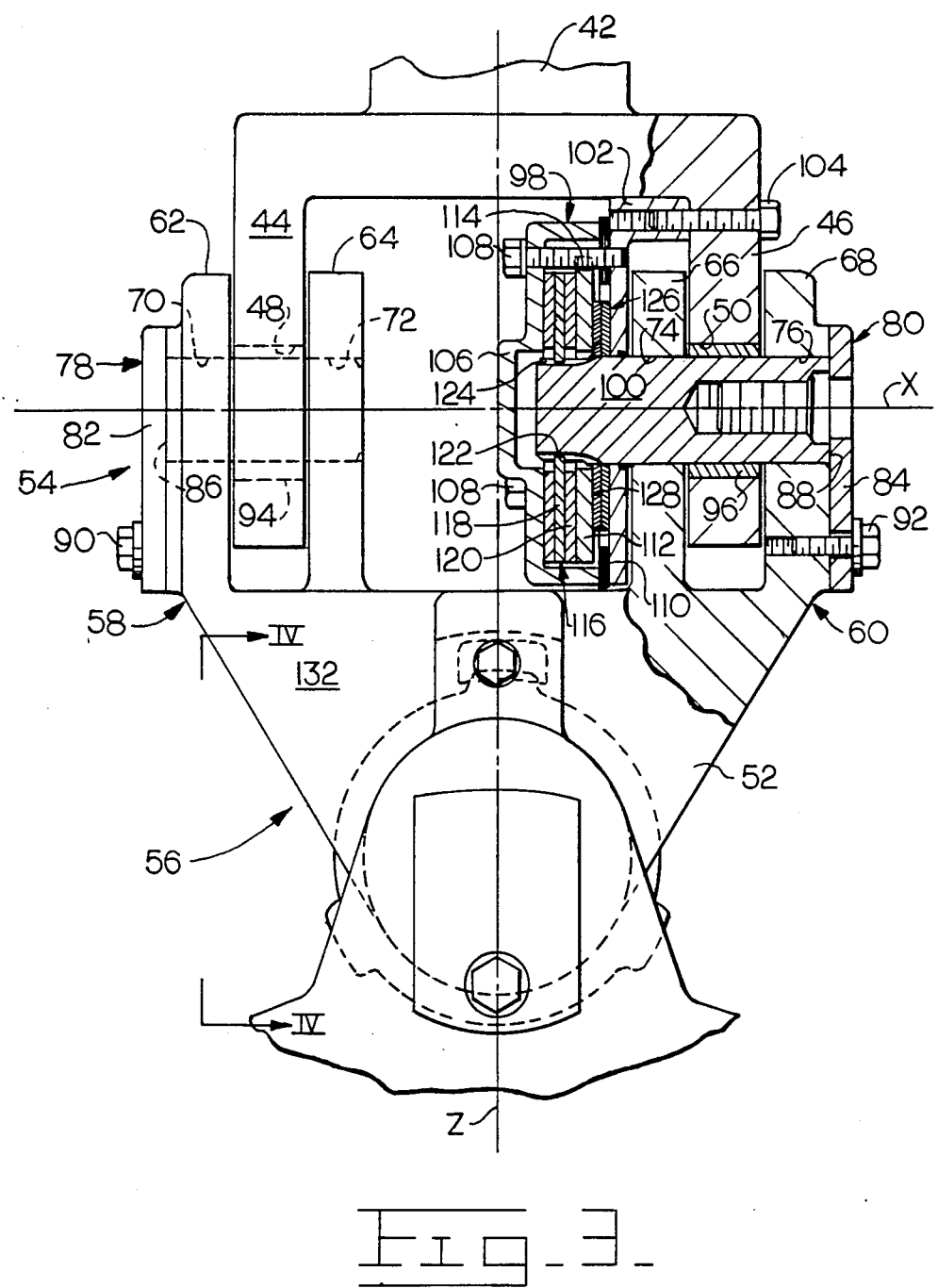
Fig_3.

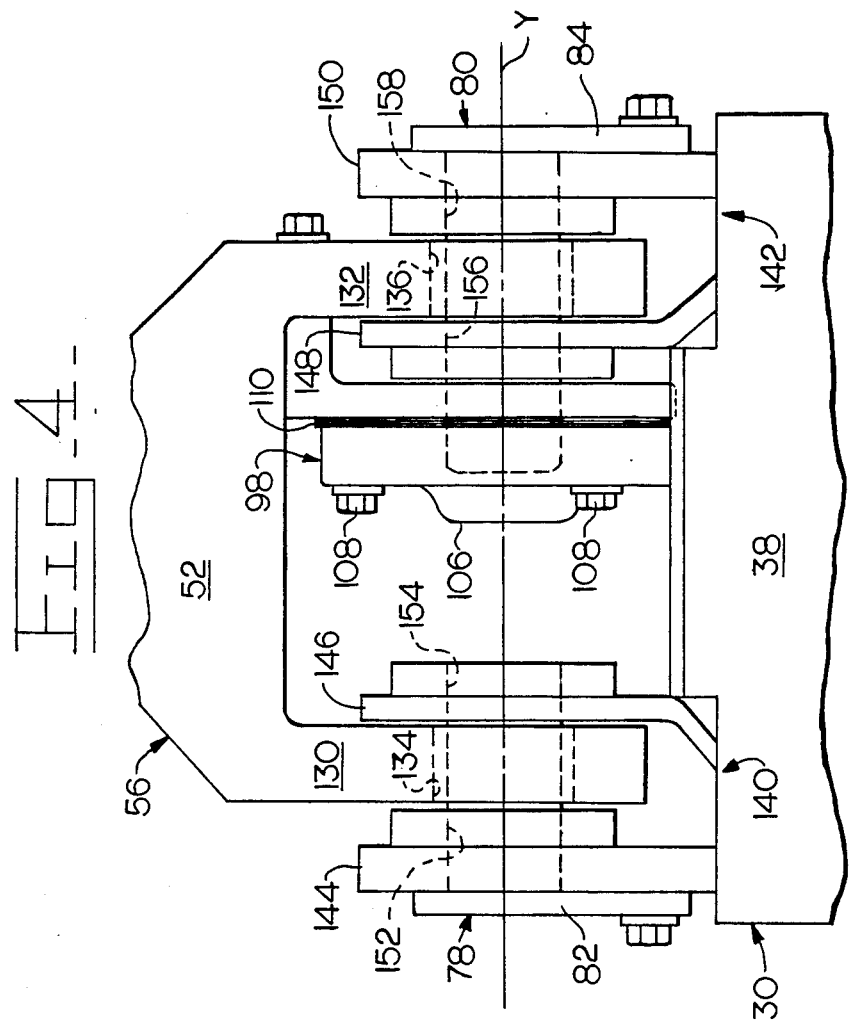

4,715,641

MOUNTING APPARATUS FOR A GRAPPLE HEAD ASSEMBLY

TECHNICAL FIELD

This invention relates to log skidding vehicles that utilize a grapple arrangement to engage one or a plurality of logs for transport from one place to another and more particularly to the mounting apparatus utilized to attach the grapple head to the vehicle.

BACKGROUND ART

In the forestry industry, it is common to use a vehicle known as a log skidder to transport fallen trees from one location to another, such as from the forest to a processing plant or loading area. Some of the log skidding vehicles utilize a grapple to grasp one or several trees by one end, lift that end from the ground and drive off dragging the trees behind the vehicle. The grapple includes a pair of mechanically actuated tongs that may be moved towards and away from each other to grasp and release the trees. The grapple frame or head is mounted to a boom that extends from the rear frame of a vehicle and may be raised and lowered to adjust the height of the grapple. A rotator is very often mounted within the boom frame and is selectively rotated by a hydraulic motor or equivalent means to aid in positioning the grapple tongs with respect to the desired load. A swivel link is normally positioned between the grapple head and the rotator and allows relative rotation therebetween about two axes that are oriented 90 degrees from each other.

While these types of log skidders have been known to work quite well for engaging and transporting logs, uncontrolled swinging of the grapple head has presented a common problem when the vehicle is driven without a load. Because of the multiplicity of pin joints that allow the grapple head the needed versatility when engaging a log, the entire apparatus tends to swing at will when driven unloaded over rough terrain. Often during this swinging, the grapple fame or tongs are brought into rather severe contact with the surrounding vehicle structure causing damage to any one of numerous components.

In order to resist this uncontrolled swinging movement, several types of motion dampers, or snubbers have been included in the area of the pin mountings between the swivel link and its connections to both the boom (or rotator) and the grapple head. One such device is the subject of a Product Information Catalog 275-1A published by the Esco Corporation and entitled, "Type III Snubber Assembly".

In that device, a friction disc retainer is positioned between the mounting flanges of the boom and each opposing face of the swivel link member. The friction disc retainer mounts replaceable friction discs for contact with the faces of the swivel link. The discs are urged into contact with the swivel link by a belleville spring that is positioned between the friction disc retainers and the boom mounting flanges. A mounting pin is centrally disposed through these members and has a threaded end portion that mounts a nut that clamps against the outside surface of one of the boom mounting flanges while a locking pin fixes the position of the mounting pin with respect to the opposing boom mounting flange. The nut may be turned inwardly, drawing the mechanism together to increase the force applied by the belleville springs that urges the friction discs against the swivel link. This increases the amount of resistance to relative movement between the two members. A similar arrangement is utilized between the swivel link and the grapple head. A major drawback with an arrangement of this type resides in the lack of protection that is afforded the snubbing mechanism from exposure to the elements and/or oil and grease that are used to operate and lubricate surrounding components. When any of the above, especially oil or grease, find their way into and around the area of the friction discs, the effectiveness is greatly reduced. Also a design of this type requires a great deal of readjustment and maintenance of the friction discs. In this particular design, the nut on the end of the mounting pin is so large than an equally large adjustment wrench must be utilized to provide sufficient force to turn the adjusting nut. Further, the swivel link cannot be disconnected from either the boom or the grapple head without complete disassembly of the snubber mechanism.

Another rotation dampening arrangement is disclosed in U.S. Pat. No. 4,335,914, issued to Adrian C. Korbel on June 22, 1982. This device utilizes one of the mounting pins that mounts the swivel link to either the rotator or grapple head as part of the dampening mechanism. The pin includes an enlarged head portion that extends outwardly into a housing that is formed in part by the swivel link. A plurality of brake discs extend between the housing and the pin head and are splined to each member. The major drawback with an arrangement of this type is the outward location of the damper housing with respect to the swivel link. Being so positioned, it is exposed to contact with various surrounding vehicular components as well as objects that may be encountered in the rugged environments in which it operates. Also, complete disassembly of the dampening mehanism is required when separation of the swivel link from either the boom rotator or grapple head is desired.

Yet another motion dampening mechanism is disclosed in U.S. Pat. No. 4,417,759 issued to Victor C. Purrott on Nov. 29, 1983. This design also utilizes a pin member that extends from one of the swivel link mountings. The pin extends outwardly from the swivel link and mounts a plurality of brake discs that extend between the pin and the swivel housing. The pin has a threaded end portion that mounts a nut that is positioned to axially capture the brake discs between a shoulder formed on the pin and the inner surface of the nut. A pair of belleville springs are positioned on each side of the brake discs and provide a compressive force against the brake discs that increases as the nut is tightened against the brake discs. This arrangement is also exposed to structural damage because of is outward positioning with respect to the swivel link. And, since the brake discs are unenclosed, they are subject to contamination by dirt, grease and oil as previously discussed and thus thereby greatly reducing the dampening ability of the mechanism. Finally, the mechanism must be totally disassembled when removal of the swivel link from either mounted component is desired.

The present invention is directed to overcoming one or more of the problems as set forth above.

DISCLOSURE OF THE INVENTION

In one aspect of the present invention, a mounting apparatus is provided that comprises a first member having first and second space-apart flanges. A second member also having first and second spaced apart flanges which are positioned in inwardly adjacent relation to the respective first and second mounting flanges of the first member, is secured to the first member for relative rotation therewith about a first axis. A means for resisting the relative rotation between the first and second members about the first axis is positioned between the mounting flanges of the second member.

By utilizing a mechanism as described above, the relative rotation between two members may be effectively dampened while the means for providing the dampening effect is protected by the surrounding structure. This is especially important when used in the type of environment previously discussed. Since the means that provides the resistance to the relative rotation between the two members is "nested" between the mounting flanges of the innermost member, a natural barrier is provided that effectively eliminates the possibility of its coming in contact with any surrounding structure.

BRIEF DESCRIPTION OF THE DRAWINGS

FIG. 1 is a diagrammatic side elevational view of a vehicle that discloses a grapple arrangement that is mounted to a boom of the vehicle by an apparatus that embraces the principles of the present invention;

FIG. 2 is a diagrammatic end view of the mounting apparatus as viewed from a point indicated by lines II—II of FIG. 1;

FIG. 3 is a diagrammatic, enlarged view of an area indicated at III of FIG. 2, and having a portion thereof broken away and shown in cross-section; and FIG. 4 is a diagrammatic end view of a portion of the mounting apparatus as viewed from lines IV—IV of FIG. 3.

BEST MODE FOR CARRYING OUT THE INVENTION

Referring to the drawings, more particularly FIG. 1, a vehicle 10 is shown having a frame 12 that is comprised of a front and rear portion 14 and 16 that are hinged together at 18 for articulation with respect to each other about a vertical axis. Each frame portion 14 and 16 supports a pair of wheels 20 and 22 on each side thereof. The front portion 14 of the frame supports an engine 24 which provides a tractive drive to each pair of wheels 20 and 22. An operator's station 26 is also mounted on the front portion 14 of the frame and houses the operator and the controls through which the machine is operated. The rear portion 16 of the frame 12 mounts a boom member 28 that is pinned to the frame for relative rotation therewith about a horizontal axis. A grapple arrangement shown generally at 30 is mounted on a distal end 32 of the boom 28 in a manner to be described in greater detail hereinafter. The grapple arrangement 30 includes a pair of tongs 34 and 36 that are pivotally mounted to a head or frame portion 38 for movement towards and away from each other (FIG. 2). Being so mounted, the boom 28 and grapple arrangement 30 may be moved along an arcuate path, upon the actuation of a hydraulic cylinder (not shown), to adjust the height of the grapple arrangement 30 with respect to the ground.

The grapple arrangement 30 is connected to the boom 28 by a mounting apparatus shown generally at 40. A first member or rotator 42 is received within the boom in a manner that permits it to be rotated with respect thereto. A hydraulic motor (not shown) or other suitable means is connected to the rotator to provide a selected amount of rotation of the grapple arrangement about a vertical axis Z under the control of an operator. The rotator 42 defines a first and second spaced-apart mounting flanges 44 and 46 that extend downwardly from the boom 28. Each of the mounting flanges 44 and 46 have an aperture 48 and 50 respectively formed therein. The apertures 48 and 50 are aligned with each other about a first, generally horizontal axis X.

A second member, commonly known as a swivel or mounting link 52 defines a first and second mounting portion 54 and 56. The first mounting portion 54 includes first and second spaced-apart mounting flanges 58 and 60. The respective mounting flanges are each defined by a pair of bifurcated plates 62, 64 and 66, 68. Each of the plates 62, 64, 66, 68 have an aperture 70, 72, 74 and 76 formed therethrough and are aligned with one another. The mounting link 52 is connected to the rotator 42 in a manner wherein plates 62 and 64 of the first mounting flange 58 are positioned on each side of the first mounting flange 44 of the rotator 42. Similarly, the plates 66 and 68 of the second mounting flange 60 of the mounting link 52 is positioned on each side of the second mounting flange 46 of the rotator 42. A first pin assembly 78 is positioned within the aligned apertures 70, 48 and 72 of the respective first mounting flanges 62, 44, and 64 of the mounting link and rotator. Likewise, a second pin assembly 80 is positioned within the aligned apertures 74, 50 and 76 of the respective mounting flanges 66, 46 and 68 of the mounting link and rotator. Each pin assembly 78 and 80 have a bracket or plate 82 and 84 fixed to a respective first end portion 86 and 88 thereof. Bracket 82 of the firt pin assembly 78 is secured to plate 62 of the mounting link by a threaded fastener 90. Similarly, bracket 84 of the second pin assembly 80 is secured to plate 68 of the mounting link 52 by a threaded fastener 92. A pair of bearing members 94 and 96 are positioned between the pin assemblies 78 and 80 and the apertures 48 and 50 formed in the mounting flanges 44 and 46 of the rotator 42. This permits the pin assemblies, and thus the mounting link, to rotate relative to the rotator.

A snubber assembly, shown generally at 98 in FIGS. 3 and 4, is positioned between the inner most plates 64 and 66 of the mounting link 52 and is engaged with a second end portion 100 of the second pin assembly 80 to resist the relative rotation between the mounting link 52 and the rotator 42. The snubber means includes a base plate member 102 that is secured to the second mounting flange 46 of the rotator 42 by a suitable means such as a bolt 104. A cover plate 106 is in turn secured to the base plate 102 by a plurality of bolts 108. A shim pack assembly 110 is removably positioned between the cover member 106 and the base plate 102 to adjustably position cover member axially with respect to the base plate. A reaction plate 112 is positioned between the cover 106 and the base plate 102 and has a plurlity of notches 114 (FIG. 3) formed at spaced intervals along its periphery. Each of the notches 114 engages one of the bolts 108 and is nonrotatably but axially slidably secured thereby. A friction disc assembly 116 consisting of a brake plate 118 and a pair of friction discs 120 is secured to opposite sides of the brake plate and is positioned between the reaction plate 112 and the cover plate 106. A splined aperture 122 is centrally formed in the brake plate 118. The splined aperture 112 is matingly engaged with a plurality of splines 124 formed about the second end portion 100 of the second pin assembly 80. A spring member 126 is formed by a pair of belleville washers 128 that are positioned between the base plate 102 and the reaction plate 112. The spring member is sized to provide a preselected amount of force against the reaction plate 112 to in turn clamp the friction disc assembly 116 against the cover member 106. It should be noted that while the snubber assembly 98 is described in association with only the second pin assembly 80, it could be utilized with either one or both pin assemblies, depending upon the desired amount of resistance to the relative rotation between the two members.

The second mounting portion 56 of the mounting link 52 also defines a pair of spaced apart mounting flanges 130 and 132, as can best be seen in FIG. 4. Each mounting flange 130 and 132 further defines an aperture 134 and 136 respectively. Apertures 134 and 136 are located along a second, generally horizontal axis Y. The second axis Y, and thus the orientation of the mounting flanges 130 and 132 is normal to that of the first axis X and the mounting flanges 58 and 60 defined by the first mounting portion 54 of the mounting link 52.

As previously decribed, the grapple arrangement 30 includes a frame or head portion 38. The head portion defines a pair of spaced apart mounting brackets 140 and 142. Each mounting bracket 140 and 142 is in turn comprised of a pair of fabricated plates 144, 146 and 148, 150, respectively. Plates 144 and 146 of mounting bracket 140 are spaced from and extend parallel to each other. The same relationship exists between plates 148 and 150 of mounting bracket 142.

An aperture 152, 154, 156 and 158 is defined in each of the respective plate 144, 146, 148 and 150. The grapple arrangement 30 is secured to the mounting link 52 with the flange 130 of the mounting link captured between plates 144 and 146 of the mounting bracket 140 of the grapple arrangement. Likewise, flange 132 of the mounting link is captured between the spaced plates 148 and 150 of the grapple arrangement. The apertures 152, 154, 156 and 158 of the grapple arrangement are aligned with the apertures 134 and 136 of the mounting link along the second axis Y. The mounting link and the grapple are secured together by an arrangement that is identical to that previously described with respect to the rotator 42 and mounting link, and for the sake of clarity, the same reference numerals will be used to identify identical components. A pair of pin assemblies 78 and 80 are positioned within the aligned bores 152, 134, 154 and 156, 136, 158 of the respective components to permit relative rotation therebetween. The pin assemblies are secured to the grapple arrangement 30 via the bracket members 82 and 84 and rotate therewith. A snubber assembly 98 is mounted to the flange 132 of the mounting link 52 and is positioned between plates 146 and 148 of the grapple member. The snubber assembly 98 is engaged with the pin assembly 80 as previously described, to provide a predetermined amount of resistance to the relative rotation that may occur between the mounting link 52 and the grapple arrangement 30.

INDUSTRIAL APPLICABILITY

In operation, the grapple arrangement 30 may be adjusted in several directions to allow its engagement with a log or logs that lay on the ground awaiting transport. The grapple may be raised or lowered by the actuation of the boom 28, rotated about a third generally vertical axis Z by actuation of a motor that is mechanically engaged with the rotator 42, and swivelled about either of the first or second horizontal axes X and Y.

Upon release of the load from the grapple tongs 34 and 36, the relative motion that afforded the required versatility in loading, is now resisted or dampened along both axes X and Y by the snubber assemblies 98. The snubber assembly 98 that is positoned along axis X (FIG. 3) is mounted to the inside of the mounting flange 46 of the rotator 42 and is operatively engaged with the second pin assembly 80. Since the pin assembly 80 is secured to the mounting flange 60 of the mounting link 52, the relative rotation is resisted by the amount of clamping force supplied by the spring member 126 against the friction disc assembly 116 and cover member 106. Likewise, the same dampening affect occurs along axis X with respect to the snubber assembly 98 and the relative rotation between the second mounting portion 56 of the mounting link 52 and the grapple arrangement 30.

Each snubber assembly 98 is positioned between the innermost mounting flanges of the respective mounted components. In being so positioned, they are naturally shielded fron contact with other structures such as rocks and/or jillpokes that may be encountered as the vehicle traverses rough terrain. In addition, each snubber assembly is protected by the mounting apparatus from exposure to grease or hydraulic fluid that may be spilled or leak from components above, such as the rotator motor.

As previously stated, the force applied by each snubber assembly 98 is determined by the amount of force applied by spring member 126 to clamp the friction disc assembly 116 against the cover plate 106. Since the cover plate is secured to one of the conponents in the mounting apparatus 40, either the rotator 42 or the mounting link 52, there are occasions when it is desirable to overcome this force and permit relative rotation between the components. One instance would be when engaging a log and/or during its transport. This, of course, causes wear to the friction disc assembly 116 and, over time, the friction discs 120 will become thinner causing the spring member 126 to expand axially. As the spring expands, less force is required to overcome the clamping force applied by the spring. This clamping force may be restored to its original force by disassembling the bolts 108 and the cover member 106 to remove the shims 110 that are positioned between the cover member and the base plate 102. This serves to reestablish the original position of the spring member 126 that had been allowed to expand through the wearing of the friction discs thus alleviating the need to replace the friction discs. Since the plurality of bolts 108 are utilized to fasten the cover member to the base plate, they may be of a standard size and therefore require only standard tools for assembly and disassembly.

If for some reason it becomes necessary to disassemble the mounting link 52 from either the rotator 42 or the grapple arrangement 30, each mounting pin assembly 78 and 80 may be removed separately. This may be accomplished by removing the threaded fasteners 90 and 92 from engagement with the respective brackets 82 and 84. This in turn allows the pin assemblies 78 and 80 to be removed axially from their positions within the aligned apertures along their respective axis. As this is done, the splines 124 on the pin assembly 80 may be slid out of engagement with the splined aperture 122 in the brake plate 118, leaving the snubber assemblies 98 completely intact. This considerably reduces the time and effort required for assembly and disassembly.

Other aspects, objects and advantages of this invention can be obtained from a study of the drawings, the disclosure and the appended claims.

I claim:

1. A mounting apparatus, comprising:
a first member having first and second spaced-apart mounting flanges;
a second member having first and second spaced-apart mounting flanges and being positioned in inwardly adjacent relation to the respective first and second mounting flanges of the first member and being secured thereto for relative rotation about a first axis; and
means for resisting relative rotation about said first axis, said means being positioned between and substantially encompassed within the profile of the mounting flanges of the second member.

2. The mounting apparatus as set forth in claim 1 wherein the first and second mounting flanges of the first and second members each define an aperture, said apertures being aligned with each other along the first axis.

3. The mounting apparatus as set forth in claim 2 wherein a pin assembly is positioned within the aligned apertures of the respective first mounting flanges of the first and second members and the aligned apertures of the respective second mounting flanges of the first and second members.

4. The mounting apparatus as set forth in claim 3 wherein one of the pin assemblies has a first end portion secured to one of the first and second members and a second end portion engaged with the rotation resisting means.

5. The mounting apparatus as set forth in claim 4 wherein the rotation resisting means further includes:
a base plate secured to the other of the first and second members;
a cover member secured to the base plate;
a reaction member non-rotatably secured to the base plate;
a friction disc assembly having a splined aperture formed therein and being located along said first axis, said friction disc assembly being positioned between the reaction member and the cover member; and
means for urging the reaction member and the friction disc assembly against the cover member under a preselected force.

6. The mounting apparatus as set forth in claim 5 wherein the second end portion of said one pin assembly has a plurlity of splines formed therearound, said splines being slidably engageable with said splined aperture formed in the friction disc assembly, said pin assembly being removable from engagement with the first and second members and said rotation resisting means without requiring the disassembly of the rotation resisting means.

7. A mounting apparatus, comprising:
a first member having first and second spaced-apart mounting flanges with an aperture formed therethrough along a first axis;
a second member having first and second spaced-apart mounting flanges each of said mounting flanges defining a pair of bifurcated plates and having an aperture formed therethrough, the respective first and second mounting flanges of the first member being positioned between the bifurcated plates defined by the respective first and second mounting flanges of the second member to position all of said apertures in alignment with each other along the first axis;
means for mounting the second member to the first member for the relative rotation therewith about the first axis, said mounting means being positioned within the aligned apertures of each of the respective first and second mounting flanges of the first and second members; and
means for resisting relative rotation between the first and second members, said rotation resisting means being engaged with one of the mounting means associated with the respective first and second mounting flanges of the first and second members, said rotation resisting means being connected to the first member and extending inwardly therefrom to a location that is between and substantially encompassed within the profile of the first and second mounting flanges of the second member.

8. The mounting apparatus as set forth in claim 7 wherein said one mounting means includes a pin assembly having a first and second end portion, said first end portion being secured to the second member and said second end portion being engaged with the rotation resisting means, said pin assembly being removable from the aligned apertures of the respective second mounting flanges of the first and second members and from engagement with the rotation resisting means to permit the disengagement of the second member from the first member without requiring the disassembly of the rotation resisting means.

9. The mounting apparatus as set forth in claim 7 wherein the rotation resisting means includes at least one brake plate having a splined aperture formed centrally therethrough along said first axis and at least one friction disc secured to the brake plate, said brake plate being clamped under a preselected force to the first member for rotation therewith.

10. The mounting apparatus as set forth in claim 9 wherein said pin assembly further defines a bracket member secured to the first end portion thereof, and a plurality of splines formed around the second end portion, said bracket member being threadably fastened to the second member, and said splines being axially, slidably engageable with the splined aperture formed in the brake plate.

11. A mounting apparatus for use between a grapple arrangement and a boom member of a vehicle, comprising:
a mounting link having a first and second mounting portion, each defining a pair of spaced-apart mounting flanges, said first mounting portion being secured to said boom member for relative rotation therewith about a first generally horizontal axis and said second mounting portion being secured to said grapple arrangement for relative rotation therewith about a second generally horizontal axis; and
means for resisting the relative rotation about either of said first or second axes said means being positioned laterally between and substanially encompassed within the profile of the respective mounting flanges of the mounting link.

12. The mounting apparatus as set forth in claim 11 wherein said first mounting portion of said mounting link further defines a pair of aligned apertures, one of said apertures being defined in each of said mounting flanges along said first axis, and said second mounting portion of the mounting link defines a pair of aligned apertures, one of said apertures being defined in each of the respective mounting flanges along said second axis, said mounting flanges of the second mounting portion being perpendicularly oriented with respect to the mounting flanges of the first mounting portion.

13. The mounting apparatus as set forth in claim 12 wherein a rotator member having a pair of spaced-apart mounting flanges and an aperture formed in each of the mounting flanges is attached to the boom member, said apertures defined by the rotator member being alignable with the apertures defined by the mounting link along said first axis, said mounting link being connected to the rotator member for rotation with respect thereto about the first axis and for rotation therewith with respect to the boom member about a third generally vertical axis.

14. The mounting apparatus as set forth in claim 12 wherein the grapple arrangement includes a frame having a pair of spaced-apart mounting brackets, each having an aperture formed therein and being axially aligned with one another, said grapple arrangement being connected to the second mounting portion of the mounting link with the apertures of the respective members being in alignment with each other along said second axis.

15. The mounting apparatus as set forth in claim 13 wherein a pin member is positioned within the aligned apertures of each of the respective first and second flange members along said first axis, one of said pin members having a first end secured to one of said rotator member and mounting link, and a second end having splines formed thereon and being engaged with the motion resisting means.

16. The mounting apparatus as set forth in claim 14 wherein a pin member is positioned within the aligned apertures of each of the respective flange members and mounting brackets along said second axis, one of said pin members having a first end secured to one of said mounting link and grapple arrangement and a second end having splines formed thereon and being engaged with the rotation resisting means.

17. The mountng apparatus as set forth in claim 15 wherein said rotation resisting means further includes:
  a base plate secured to the rotator member;
  a cover member secured to the base plate member;
  a reaction plate non-rotatably secured to the base plate;
  at least one brake plate having a friction discs positioned on each side thereof and a splined aperture formed therethrough and being engaged with the second end portion of said one pin member, said brake plate being positioned between the cover member and the reaction plate; and
  a spring member positioned between the base plate and the reaction plate to urge the reaction plate and the brake plate against the cover member.

18. The mounting apparatus as set forth in claim 17 wherein at least one shim member is positioned between the cover member and the base plate to position cover member a preselected distance from the base plate to provide the spring member with a preselected amount of preload, said shim member being removable from said position between the cover member and the base plate upon a preselected amount of wear of the friction disc members attached to the brake plate to thereby reestablish the preselected amount of preload to the spring member.

19. A mounting apparatus, comprising:
  a first member having first and second spaced-apart mounting flanges, each of said flanges having an aperture formed therethrough along a first axis;
  a second member having first and second spaced-apart mounting flanges, each of said flanges having an aperture formed therethrough, said second member being positionable with the apertures thereof in alignment with the aperture of the first member along the first axis;
  a pin assembly having a first end portion secured to the second member and a second end portion, said pin assembly being positioned within said aligned apertures along said first axis for mounting the second member to the first member for the relative rotation therewith; and
  means for resisting relative rotation between the first and second members, said rotation resisting means being positioned between the respective first and second mounting flanges of the first and second members and being connected to the first member in a manner to engage the second end portion of the pin assembly to permit the removal thereof and the disengagement of the second member from the first member without requiring the disassembly of the rotation resisting means.

* * * * *